(12) United States Patent
Nemazie et al.

(10) Patent No.: US 9,727,245 B2
(45) Date of Patent: Aug. 8, 2017

(54) METHOD AND APPARATUS FOR DE-DUPLICATION FOR SOLID STATE DISKS (SSDS)

(71) Applicant: Avalanche Technology, Inc., Fremont, CA (US)

(72) Inventors: Siamack Nemazie, Los Altos Hills, CA (US); Mehdi Asnaashari, Danville, CA (US); Ruchirkumar D. Shah, San Jose, CA (US)

(73) Assignee: Avalanche Technology, Inc., Fremont, CA (US)

( * ) Notice: Subject to any disclaimer, the term of this patent is extended or adjusted under 35 U.S.C. 154(b) by 0 days.

(21) Appl. No.: 14/722,038

(22) Filed: May 26, 2015

(65) Prior Publication Data

US 2015/0253999 A1 Sep. 10, 2015

Related U.S. Application Data

(63) Continuation-in-part of application No. 13/858,875, filed on Apr. 8, 2013, now Pat. No. 9,251,059, and a continuation-in-part of application No. 14/595,170, filed on Jan. 12, 2015, which is a continuation of application No. 14/040,280, filed on Sep. 27, 2013, now Pat. No. 8,954,657, application No. 14/722,038, which is a continuation-in-part of application No. 14/629,404, filed on Feb. 23, 2015, which is a continuation of application No. 14/050,274, filed on
(Continued)

(51) Int. Cl.
*G06F 12/00* (2006.01)
*G06F 3/06* (2006.01)
*G06F 12/02* (2006.01)
*G06F 12/0868* (2016.01)
*G06F 12/0873* (2016.01)
*G06F 11/10* (2006.01)

(52) U.S. Cl.
CPC .......... *G06F 3/0608* (2013.01); *G06F 3/0641* (2013.01); *G06F 3/0688* (2013.01); *G06F 11/10* (2013.01); *G06F 12/0246* (2013.01); *G06F 12/0868* (2013.01); *G06F 12/0873* (2013.01); *G06F 2212/222* (2013.01); *G06F 2212/262* (2013.01); *G06F 2212/7205* (2013.01)

(58) Field of Classification Search
None
See application file for complete search history.

(56) References Cited

U.S. PATENT DOCUMENTS

| | | | |
|---|---|---|---|
| 2013/0275671 A1* | 10/2013 | Domsch ................ | G06F 3/0604 711/114 |
| 2016/0179395 A1* | 6/2016 | Fisher .................... | G06F 3/0608 711/103 |

* cited by examiner

*Primary Examiner* — Baboucarr Faal
(74) *Attorney, Agent, or Firm* — Maryam Imam; Bing K. Yen

(57) ABSTRACT

In accordance with a method of the invention, host data, accompanied by host LBA, is received from a host. If the host data is determined not to be a duplicate host data, an available intermediate LBA (iLBA) is identified and the host LBA is linked to the identified iLBA. During writing of the received host data to the SSDs, an available SLBA is identified and saved to a table at a location indexed by the identified iLBA. Accordingly, the next time the same host data is received, it is recognized as a duplicate host data and the host address accompanying it is linked to the same iLBA, which is already associated with the same SLBA. Upon this recognition, an actual write to the SSDs is avoided.

20 Claims, 10 Drawing Sheets

Related U.S. Application Data

Oct. 9, 2013, now Pat. No. 8,966,164, application No. 14/722,038, which is a continuation-in-part of application No. 14/678,777, filed on Apr. 3, 2015, which is a continuation-in-part of application No. 14/073,669, filed on Nov. 6, 2013, now Pat. No. 9,009,397, application No. 14/722,038, which is a continuation-in-part of application No. 14/617,868, filed on Feb. 9, 2015, which is a continuation of application No. 14/090,910, filed on Nov. 26, 2013, now Pat. No. 8,954,658, application No. 14/722,038, which is a continuation-in-part of application No. 14/171,234, filed on Feb. 3, 2014.

(60) Provisional application No. 61/800,286, filed on Mar. 15, 2013.

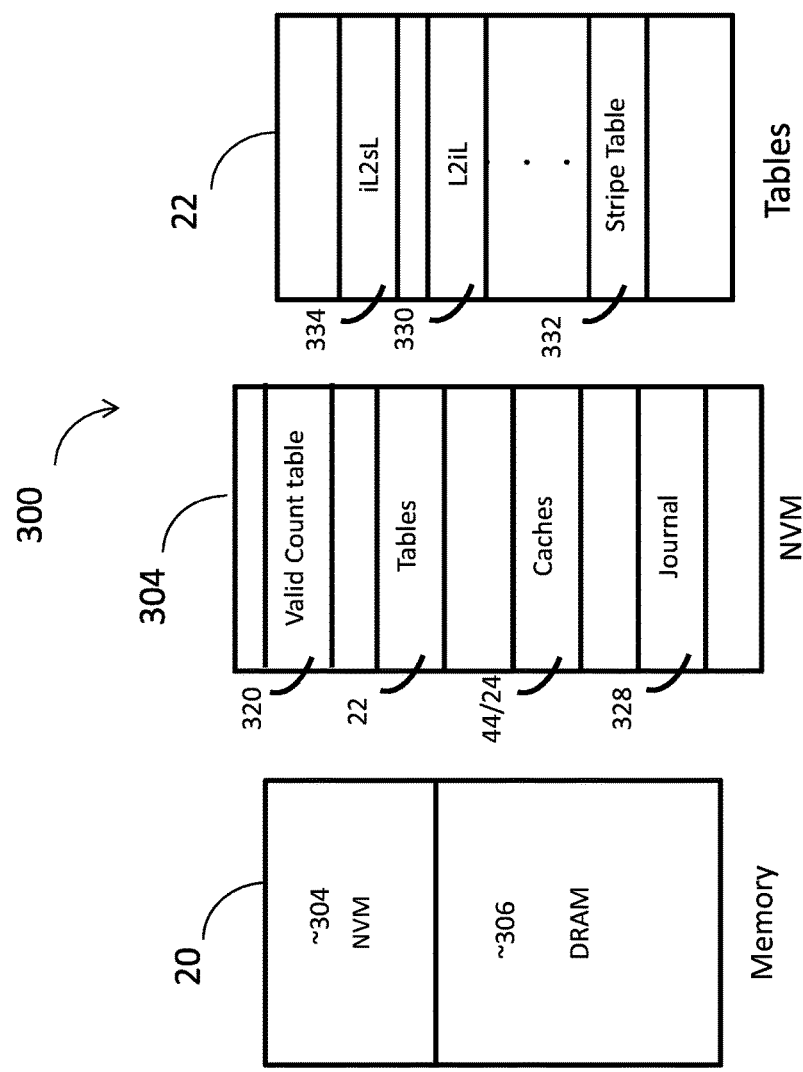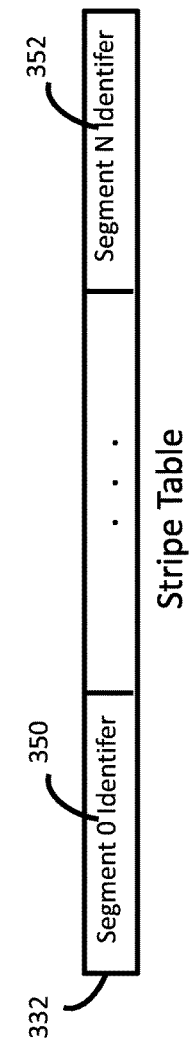

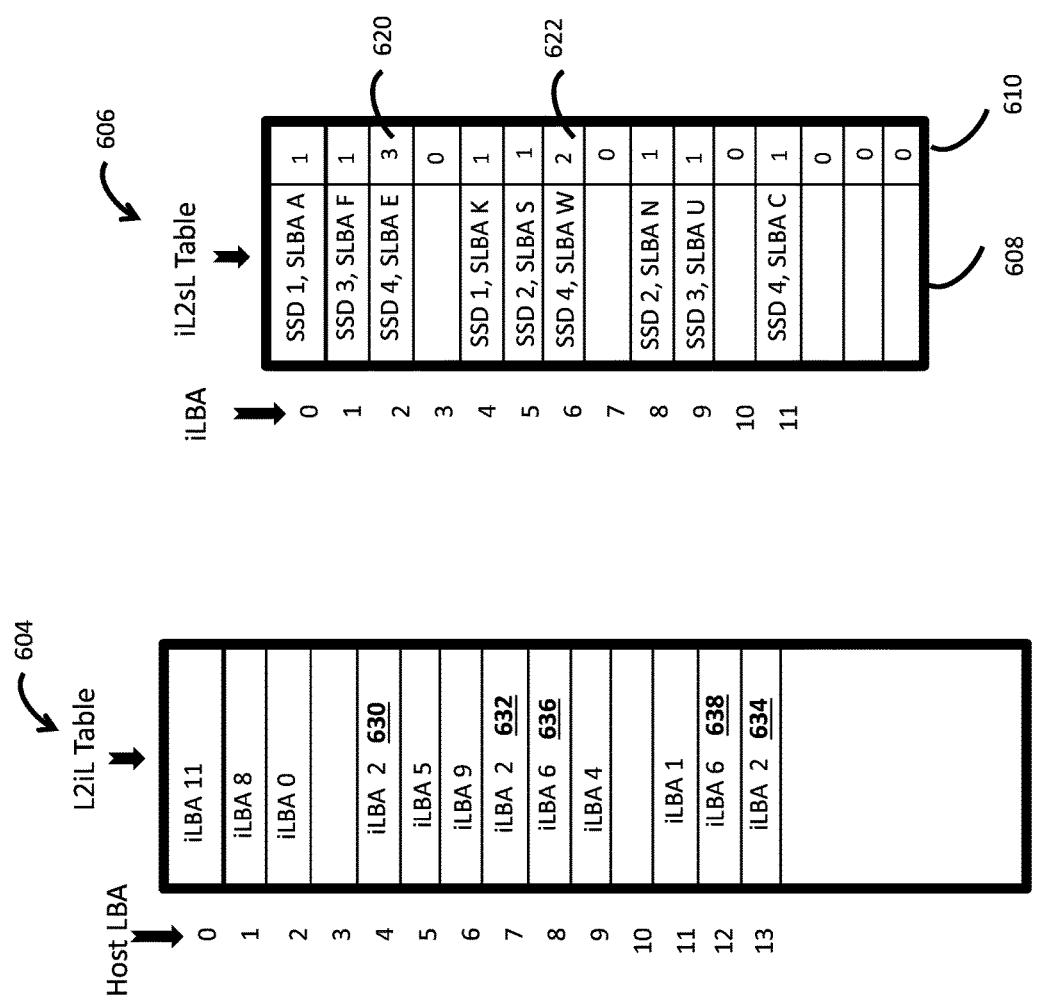

iL2sL Table 760

| iLBA | SSD/SLBA | Count Value | Offset | Size |
|---|---|---|---|---|
| 0 | SSD 1, SLBA A | 1 | | |
| 1 | SSD 3, SLBA F | 1 | | |
| 2 | SSD 4, SLBA E | 3  *780* | | |
| 3 | | 0 | | |
| 4 | SSD 1, SLBA K | 1 | | |
| 5 | SSD 2, SLBA S | 1 | | |
| 6 | SSD 4, SLBA W | 2  *782* | 32  *790* | 2044  *792* |
| 7 | | 0 | | |
| 8 | SSD 2, SLBA N | 1 | | |
| 9 | SSD 3, SLBA U | 1 | | |
| 10 | | 0 | | |
| 11 | SSD 4, SLBA C | 1 | | |
| | | 0 | | |
| | | 0 | | |

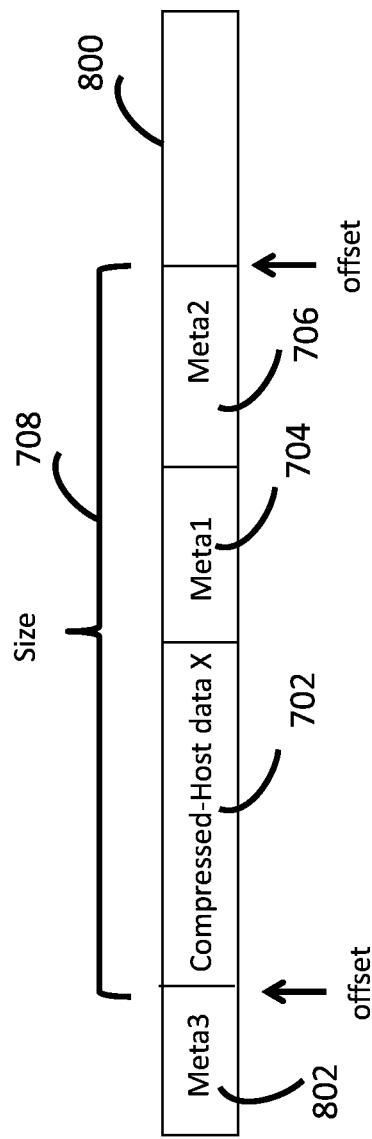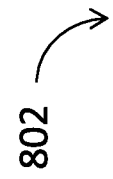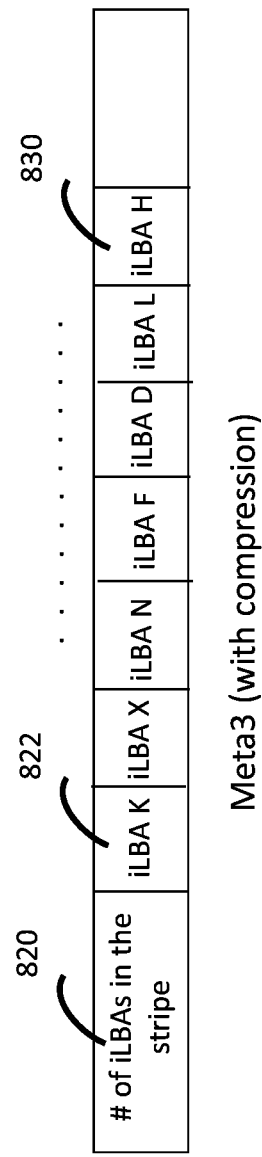
Fig. 8a
Fig. 8b

METHOD AND APPARATUS FOR DE-DUPLICATION FOR SOLID STATE DISKS (SSDS)

CROSS REFERENCE TO RELATED APPLICATIONS

This application is a continuation-in-part of U.S. patent application Ser. No. 13/858,875, filed on Apr. 8, 2013, by Siamack Nemazie, et al. and entitled "Storage System Employing MRAM and Redundant Array of Solid State Disk", which claims priority to U.S. Provisional Patent Application No. 61/800,286, filed on Mar. 15, 2013, by Siamack Nemazie, et al. and entitled "STORAGE SYSTEM EMPLOYING MRAM AND ARRAY OF SOLID STATE DISKS WITH INTEGRATED SWITCH", and is a continuation-in-part of U.S. patent application Ser. No. 14/595,170, filed on Jan. 12, 2015, by Mehdi Asnaashari, et al. and entitled "STORAGE PROCESSOR MANAGING SOLID STATE DISK ARRAY", which is a continuation of U.S. patent application Ser. No. 14/040,280, filed on Sep. 27, 2013, by Mehdi Asnaashari, and entitled "STORAGE PROCESSOR MANAGING SOLID STATE DISK ARRAY" and is a continuation-in-part of U.S. patent application Ser. No. 14/629,404, filed on Feb. 23, 2015, entitled "STORAGE PROCESSOR MANAGING NVME LOGICALLY ADDRESSED SOLID STATE DISK ARRAY", which is a continuation of U.S. patent application Ser. No. 14/050,274, filed on Oct. 9, 2013, by Mehdi Asnaashai, and entitled "STORAGE PROCESSOR MANAGING NVME LOGICALLY ADDRESSED SOLID STATE DISK ARRAY", which is a continuation-in-part of U.S. patent application Ser. No. 14/040,280, filed on Sep. 27, 2013, by Mehdi Asnaashai, and entitled "STORAGE PROCESSOR MANAGING SOLID STATE DISK ARRAY", and is a continuation-in-part of U.S. patent application Ser. No. 14/678,777, filed on Apr. 3, 2015, entitled "STORAGE SYSTEM REDUNDANT ARRAY OF SOLID STATE DISK ARRAY", Mehdi Asnaashai, et al. which is a continuation in part of U.S. patent application Ser. No. 14/073,669, filed on Nov. 6, 2013, by Mehdi Asnaashari, and entitled "STORAGE PROCESSOR MANAGING SOLID STATE DISK ARRAY", and and is a continuation in part of U.S. patent application Ser. No. 14/617,868, filed on Feb. 9, 2015, by Mehdi Asnaashari and entitled "A METHOD OF LUN MANAGEMENT IN A SOLID STATE DISK ARRAY", which is continuation of U.S. patent application Ser. No. 14/090,910, filed on Nov. 26, 2013, by Mehdi Asnaashari, and entitled "A METHOD OF LUN MANAGEMENT IN A SOLID STATE DISK ARRAY", and a continuation-in-part of U.S. patent application Ser. No. 14/171,234, filed on Feb. 3, 2014, by Mehdi Asnaashari et al., and entitled "STORAGE PROCESSOR MANAGING SOLID STATE DISK ARRAY", incorporated herein by reference as though set forth in full.

FIELD OF THE INVENTION

This invention relates generally to solid state disks and particularly to data reduction schemes used by solid state disks.

BACKGROUND

It is not rare for multiple host logical block addresses (LBAs) identifying data, in blocks, that is intended for saving (or "writing") to solid state disks (SSDs) to arrive from a host in duplicates. That is, two different host LBAs, with a common data, may each point to the same SSD LBA (SLBA) yet arrive at different times.

Data reduction techniques, such as block-level deduplication and compression, are widely used in the industry to take advantage of duplications by avoiding writing the same data more than once and therefore reduce enterprise storage requirements as well as the overall cost of data storage. This can and typically does, in enterprise applications, in particular, result in great cost-savings where large data is abundant.

That is, when data reduction techniques, such as deduplication, are employed in a storage application, the same data associated with multiple host blocks is written only once to storage (such as SSDs). Accordingly, deduplication reduces storage capacity requirements for data storage by eliminating duplicated blocks of data that are identified by non-identical LBAs.

However, current methods of de-duplication are not abundantly employed in Redundant Array of Independent Disks (RAID) applications using SSDs. Those employed are not efficient and at times, costly.

Therefore, there is a need for a method and apparatus to efficiently and with lower costs, avoid writing duplicates of host data to SSDs.

SUMMARY OF THE INVENTION

Briefly, in accordance with a method and apparatus of the invention, de-duplication of solid state disks (SSDs) is employed. Host data, accompanied by host address is received from a host. If the host data is determined not to be a duplicate host data, an available intermediate LBA (iLBA) is identified and the host LBA is linked to the identified iLBA. During writing of the received host data to the SSDs, an available SLBA is identified and saved to a table at a location indexed by the identified iLBA. Accordingly, the next time the same host data is received, it is recognized as a duplicate host data and the host address accompanying it is linked to the same iLBA, which is already associated with the same SLBA. Upon this recognition, an actual write to the SSDs is avoided.

These and other features of the invention will no doubt become apparent to those skilled in the art after having read the following detailed description of the various embodiments illustrated in the several figures of the drawing.

IN THE DRAWINGS

FIGS. 3a-3d show further details of the memory of the embodiments of FIGS. 1 and 2, in accordance with an embodiment of the invention.

FIGS. 6a and 6b show an example of a L2iL table and an iL2sL table, used during the writing process, in accordance with embodiments and methods of the invention.

Figure 7A:
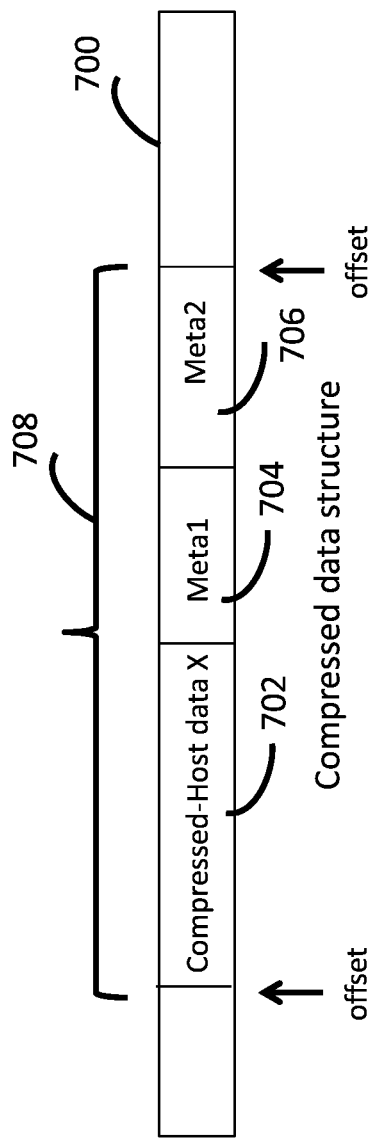
Figure 7B:
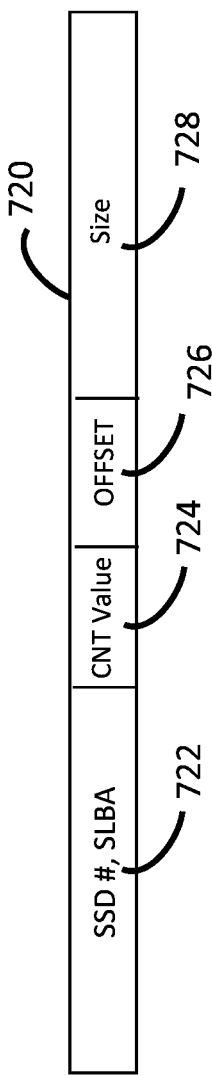

FIGS. 7a, and 7b show exemplary data structures for compression, in accordance with an embodiments and methods of the invention.

FIG. 7c shows an exemplary table, in accordance with embodiments and methods of the invention.

FIGS. 8a, and 8b show exemplary data structures for identifying valid SLBAs, in accordance with embodiments and methods of the invention.

Figure 9:
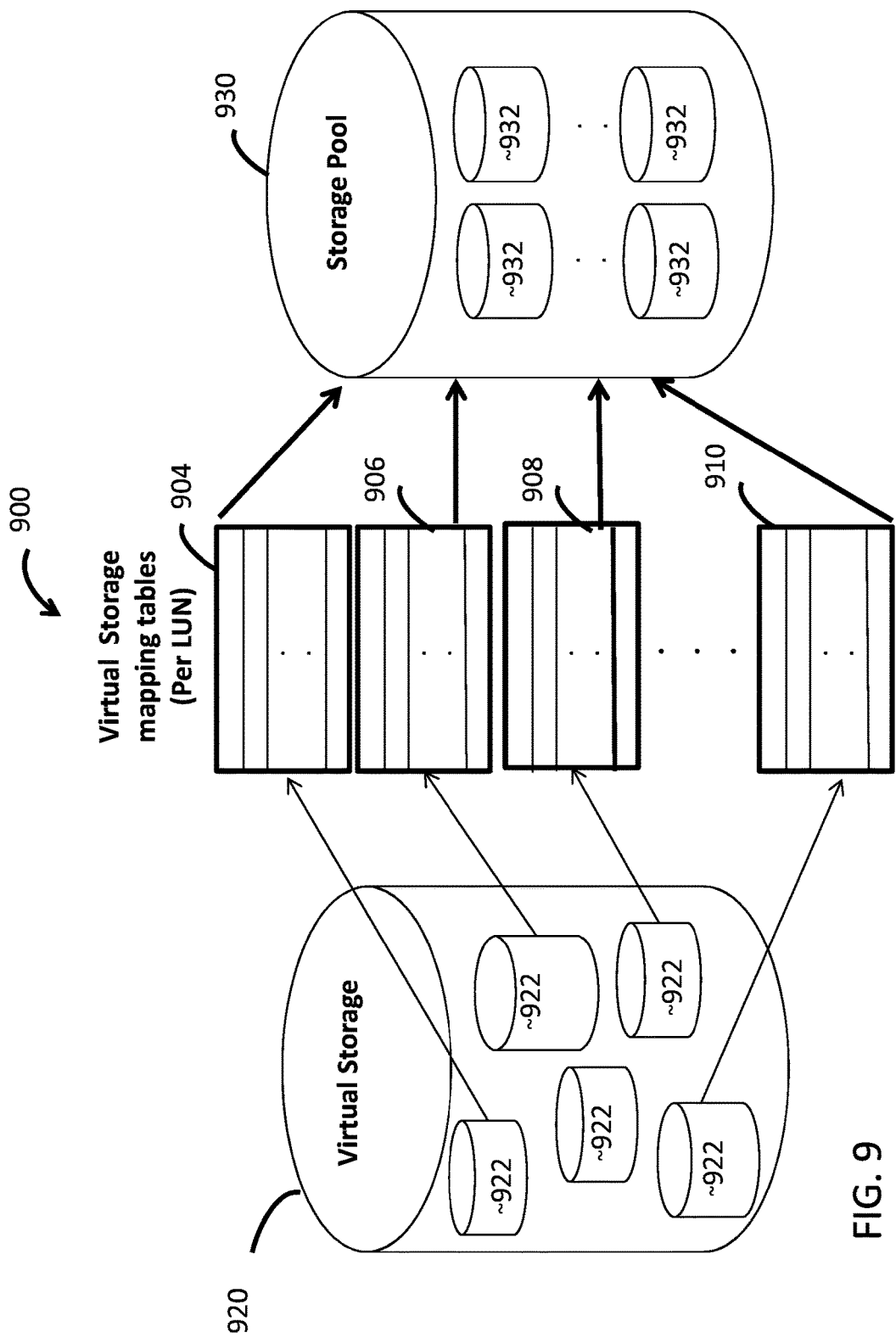

FIG. 9 shows a relationship between a virtual storage and a storage pool (physical storage) employing virtual storage mapping tables in association with thin provisioning and in accordance with an embodiment and method of the invention.

DETAILED DESCRIPTION OF EMBODIMENTS

In the following description of the embodiments, reference is made to the accompanying drawings that form a part hereof, and in which is shown by way of illustration of the specific embodiments in which the invention may be practiced. It is to be understood that other embodiments may be utilized because structural changes may be made without departing from the scope of the invention. It should be noted that the figures discussed herein are not drawn to scale and thicknesses of lines are not indicative of actual sizes.

In accordance with deduplication embodiments and methods of the invention, Writing of a duplication host data is avoided using an intermediate logical block address (iLBA). Avoiding writing of host data is quite effective in terms of cost and performance in large capacity storage applications, such as storage appliances, and organizations with many users sharing similar data and files.

In accordance with alternate embodiments and methods of the invention, compression is employed as part of data reduction to further reduce data. The number of host blocks in a stripe as well as the size and location of the compressed host data within the stripe varies based on the compression entropy of the data.

Links between host logical block addresses (LBAs) (sometimes referred to as "host blocks") and solid state disk (SSD) SLBAs, SLBAs, are made through use of the iLBAs, upon detection of a duplicate host data in the storage appliance and the link is broken ("unlinked") once that association no longer exist.

When host data of a host block, of a particular stripe, is updated (or "re-written"), the SLBA assigned to the host block is not overwritten and is instead assigned to another SLBA in the same stripe and data associated with the host block is written to the newly-assigned SLBA. The previously-assigned SLBA is marked as invalid (or "old") and tracked by a storage processor externally located to the SSDs. The SSDs however, remain ignorant of this assignment or even the arrival of duplicate host data because the storage processor does not notify the SSDs of invalid SLBA at this juncture. Therefore, in the view of the SSDs, both the previously-assigned SLBA and a newly-assigned SLBA are both associated with valid host data (or "valid data").

In contrast thereto, the storage processor is well aware of the previously-assigned SLBAs and that they point to invalid data and therefore regards them as candidates for garbage collection. The storage processor typically performs "logical garbage collection" whereas the SSDs perform "physical garbage collection", the difference being that in the former case, logical rather than physical addresses are used to address host blocks during garbage collection, whereas in the latter case, physical rather than logical addresses are used to address host blocks during garbage collection.

During logical garbage collection, the storage processor selects a stripe with the most number of invalid SLBAs. It moves all (host) data corresponding to valid SLBAs of the selected stripe to another (current) stripe, and then signals the corresponding SSDs of the selected stripe to invalidate all SLBAs of the stripe. In accordance with industry standards, an exemplary method of such signaling is using a TRIM command but it should be noted that any suitable command or even different ways of notification may be employed without departing from the scope and spirit of the invention. Wherever "garbage collection" is used herein, it is intended to be "logical garbage collection".

It is further noted that the storage processor leaves the parity segments of the selected stripe in tact during the (logical) garbage collection because once there are no valid data in the selected stripe, the parity segment is no longer of any use or value, hence it need not be moved or otherwise preserved.

As used herein, the term "channel" is interchangeable with the term "flash channel" and "flash bus". As used herein, a "segment" refers to a chunk of data in the flash subsystem of the laSSD that, in an exemplary embodiment, may be made of one or more pages. However, it is understood that other embodiments are contemplated, such as without limitation, one or more blocks and others known to those in the art.

The term "block" as used herein, refers to an erasable unit of data. That is, data that is erased as a unit defines a "block". In some patent documents and the industry, a "block" refers to a unit of data being transferred to, or received from, a host, as used herein, this type of block may be referenced as "data block". A "page" as used herein, refers to data that is written as a unit. Data that is written as a unit is herein referred to as "write data unit". A "dual-page" as used herein, refers to a specific unit of two pages being programmed/read, as known in the industry. In an embodiment of the invention, a "segment" includes one or more pages that are in like-locations in a super block within one or more SSDs but that their associated blocks may, but need not be, in like-locations across the flash subsystem of one or more SSDs. In an embodiment of the invention, a "stripe" as used herein, includes multiple segments.

In accordance with an embodiment and method of the invention, a storage system includes one or more de-duplication of SSDs is employed. Host data, accompanied by host address is received from a host. If the host data is determined not to be a duplicate host data, an available intermediate LBA (iLBA) is identified and the host LBA is linked to the identified iLBA. During writing of the received host data to the SSDs, an available SLBA is identified and saved to a table at a location indexed by the identified iLBA. Accordingly, the next time the same host data is received, it is recognized as a duplicate host data and the host address accompanying it is linked to the same iLBA, which is already associated with the same SLBA. Upon this recognition, an actual write to the SSDs is avoided.

Figure 1:
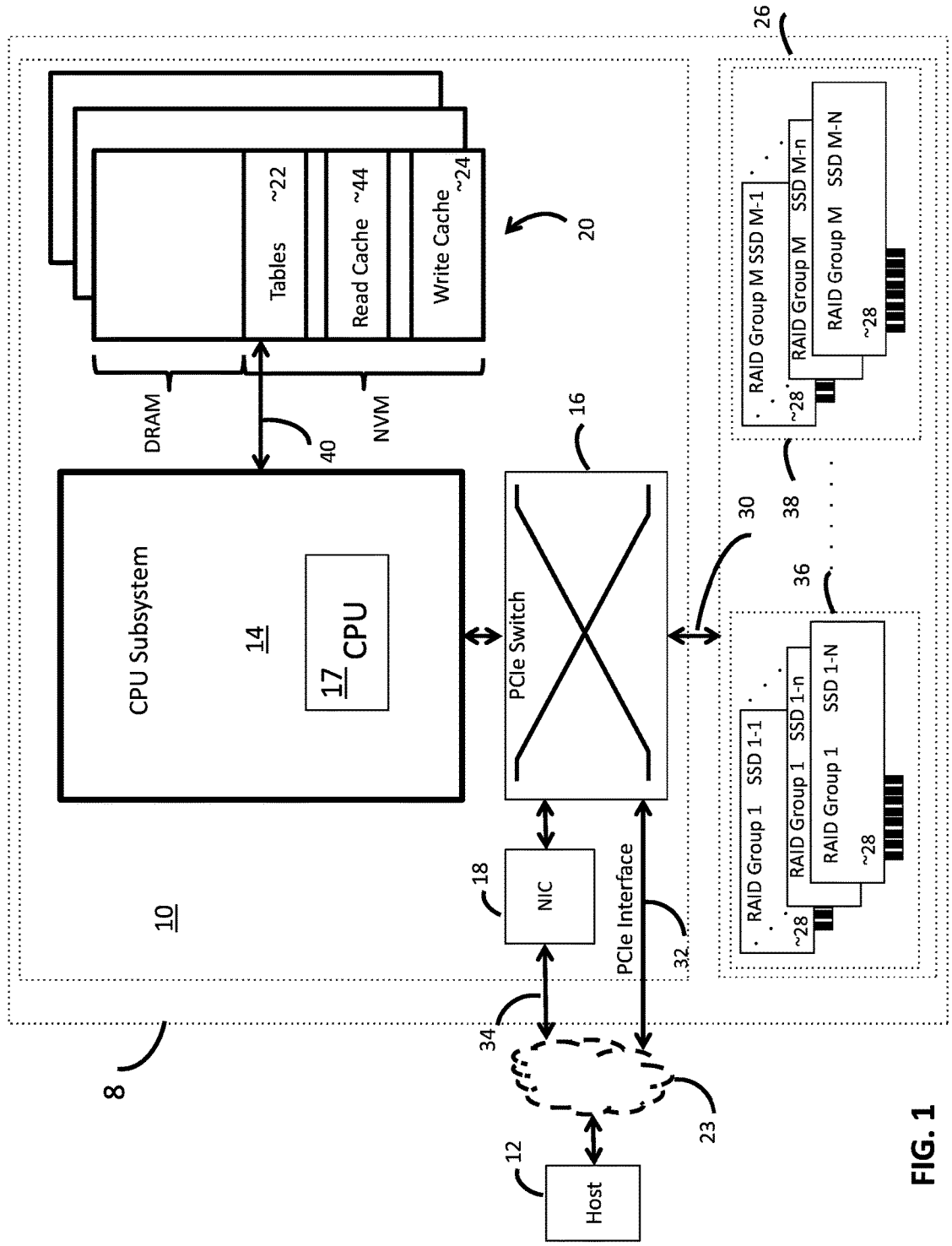
FIG. 1 shows a storage system (or "appliance"), in block diagram form, in accordance with an embodiment of the invention.

Referring now to FIG. 1, a storage system (or "appliance") 8 is shown, in block diagram form, in accordance with an embodiment of the invention.

The storage system 8 is shown to include storage processor 10 and a storage pool 26 that are shown communicatively coupled together through a network 23.

The storage pool 26 is shown to include banks of solid state drives (SSDs) 36 and 38 with the understanding that the storage pool 26 may have additional SSDs than that which is shown in the embodiment of FIG. 1. A number of SSD groups are configured as RAID groups, such as RAID group 1 of the bank 36, and shown to include SSD 1-1 through SSD 1-N ('N' being an integer value), and there are M number of them, through RAID group M ('M' being an integer value), the RAID group M being shown made of SSDs M-1 through M-N.

In an embodiment of the invention, the storage pool 26 of the storage system 8 is a Peripheral Component Interconnect Express (PCIe) solid state disks (SSD), herein thereafter referred to as "PCIe SSD", because it conforms to the PCIe standard, adopted by the industry at large. Industry-standard storage protocols defining a PCIe bus, include non-volatile memory express (NVMe). It is however understood that other types of SSDs may be employed.

The storage system 8 is shown coupled to host 12 either directly or through the network 23. The storage processor 10 is shown to include a CPU subsystem 14, a PCIe switch 16, a network interface card (NIC) 18, and memory 20. The memory 20 is shown to include different types of memory, such as dynamic random access memory (DRAM) and non-volatile memory (NVM). The NVM is shown to comprise mapping tables (or "tables") 22, read cache 44 and write cache 24. The DRAM of the memory 22 is typically used by the CPU subsystem 14 to save data.

The storage processor 10 is further shown to include an interface 34 and an interface 32. The CPU subsystem 14 includes a CPU 17, which may be a single or a multi-core CPU. The CPU 17 is the brain of the CPU subsystem 14 and as will be shortly evident, performs processes or steps in carrying out some of the functions of the various embodiments of the invention. The CPU subsystem 14 and the storage pool 26 are shown coupled together through the PCIe switch 16 via the bus 30. The CPU subsystem 14 and the memory 20 are shown coupled together through a memory bus 40.

The memory 20 is shown to include information utilized by the CPU 14, such as mapping tables 22, read cache 44 and write cache 24. It is understood that the memory 20 may, and typically does, store additional information, not depicted in FIG. 1.

The host 12 is shown coupled to the NIC 18 through the network interface 34 and is optionally coupled to the PCIe switch 16 through the PCIe interface 32. In the illustrative embodiment of the invention, FIG. 1, the interfaces 34 and 32 are indirectly coupled to the host 12, through the network 23. An example of a network is the internet (world wide web) or Ethernet local-area network or a fiber channel storage-area network.

The NIC 18 is shown coupled to the network interface 34 for communicating with the host 12 (generally located externally to the processor 10) and to the CPU subsystem 14, through the PCIe switch 16.

The storage processor performs logical garbage collection at a stripe, or a group of stripes (also referred to herein as "super stripe") level. Logical garbage collection is consistent with the SLBAs assignment to physical blocks in a laSSD. The storage processor avoids overwrite of an assigned SLBA until completion of logical garbage collection of associated blocks. LBA updates are assigned to free ("unassigned" or "available") SLBAs. The storage processor maintains track of SLBAs that are no longer valid and have to be eventually garbage collected.

In one embodiment of the invention, the storage processor 10 picks out a SLBA stripe or groups of stripes with the largest number of invalid SLBAs as candidates for logical garbage collection. Logical garbage collection includes moving all valid SLBAs from associated groups being logically garbage collected to other (available) SLBA groups, until there are no longer any valid SLBAs within the group. Thereafter, the storage processor 10 issues a command such as without limitation, a SCSI TRIM command, to the laSSDs invalidating the SLBAs in the groups that were collected as candidates for garbage collection. Finally, the valid SLBAs that have been moved to other SLBA groups are moved back.

As earlier noted, the laSSDs perform physical garbage collection. While performing physical garbage collection, the laSSDs detect that all pages within the blocks of stripes are invalid and therefore need not be moved and are then simply erased at a block level.

In embodiments using TRIM command, the TRIM command may be implemented in various ways, such as the following. LaSSDs only perform erase operations during garbage collection and after receiving, but not immediately, the TRIM command. In yet another embodiment, laSSD perform an erase operation immediately after the TRIM command. In yet another embodiment, a laSSD does not send notification of the completion of garbage collection (or response to the TRIM command) until the erase operation is completed and in another embodiment, it sends the TRIM command during the erase operation. In the case of the former, the completion of the TRIM command is the completion of the erase operation and as such, the behavior of the laSSD is predictable by the storage processor 10.

In another embodiment of the invention, the storage processor 10 makes sure that only one TRIM command is outstanding in a RAID group. The storage processor reconstructs read operations, targeted to a flash device (within the SSDs) being busy with acting upon the TRIM command, using the remaining flash devices in the RAID group.

In an embodiment of the invention, parts or all of the memory 20 are volatile, such as without limitation, made of DRAM. In other embodiments, parts or all of the memory 20 is non-volatile, such as and without limitation, flash, magnetic random access memory (MRAM), spin transfer torque magnetic random access memory (STTMRAM), resistive random access memory (RRAM), or phase change memory (PCM). In still other embodiments, the memory 20 is made of both volatile and non-volatile memory, such as DRAM on Dual In Line Module (DIMM) and non-volatile memory on DIMM (NVDIMM), and memory bus 40 is the a DIM interface.

The memory 20 is shown to save information utilized by the CPU 17, such as the tables 22, and to cache data in the read cache 44 and the write cache 24. The write cache 24 caches data utilized by the CPU subsystem 14, such as for writing operations requiring fast access to information. The read cache caches data read by the CPU subsystem 14.

In one embodiment of the invention, the read/write caches 44/24 are in the non-volatile memory part of the memory 20. The write cache 24 is used for caching write data from the host 12 until the host data is written to storage pool 26. This provides a consistent latency for write operations.

In embodiments where the tables 22 are saved in non-volatile part of the memory 20, the mapping tables 22 remain intact even when power is not applied to the memory 20.

During operation, the host 12 issues a read or a write command. Information from the host is normally transferred between the host 12 and the storage processor 10 through the interfaces 32 and/or 34. For example, information is transferred, through interface 34, between the storage processor 10 and the NIC 18 and the host 12. Information between the host 12 and the PCIe switch 16 is transferred using the interface 32 and under the direction of the of the CPU subsystem 14.

In the case where data is to be stored (or "saved"), i.e. a write operation is consummated; the CPU subsystem 14 receives the write command and accompanying ("host" or "host user" or "user") data for storage, from the host and through PCIe switch 16. The received data is first written to write cache 24 and ultimately saved in the storage pool 26, under the control of the CPU subsystem 14. The host write command typically includes a starting LBA and the number of LBAs (sector count) that the host intends to write to as well as a LUN. The starting LBA in combination with the sector count is referred to herein as "host LBAs" or "host-provided LBAs".

The storage processor 10 or the CPU subsystem 14 maps the host-provided LBAs to portions of the storage pool 26. To this end, sub-commands are formed from the host command based on a granularity and the sub-commands are ultimately utilized to identify locations with the storage pool 26 to write the host data.

Before committing the sub-commands to the storage pool, the CPU subsystem 14 first checks for a duplicate of the data within the storage pool. Upon detecting a duplicate, tables are updated. If no duplication is detected, the storage processor maps the location of the host data to an intermediate LBA (iLBA) and the iLBA is then mapped to a SLBA.

In the discussions and figures herein, it is understood that the CPU subsystem 14 executes code (or "software program(s)") to perform the various tasks discussed. It is contemplated that the same may be done using dedicated hardware or other hardware and/or software-related means.

The storage system 8 is suitable for various applications, such as without limitation, network attached storage (NAS) or storage attached network (SAN) applications that support many logical unit numbers (LUNs) associated with various users. The users initially create LUNs with different sizes and portions of the storage pool 26 are allocated to each of the LUNs.

In an embodiment of the invention, as further discussed below, the table 22 maintains the mapping of host LBAs to SSD LBAs (SLBAs).

Figure 2:
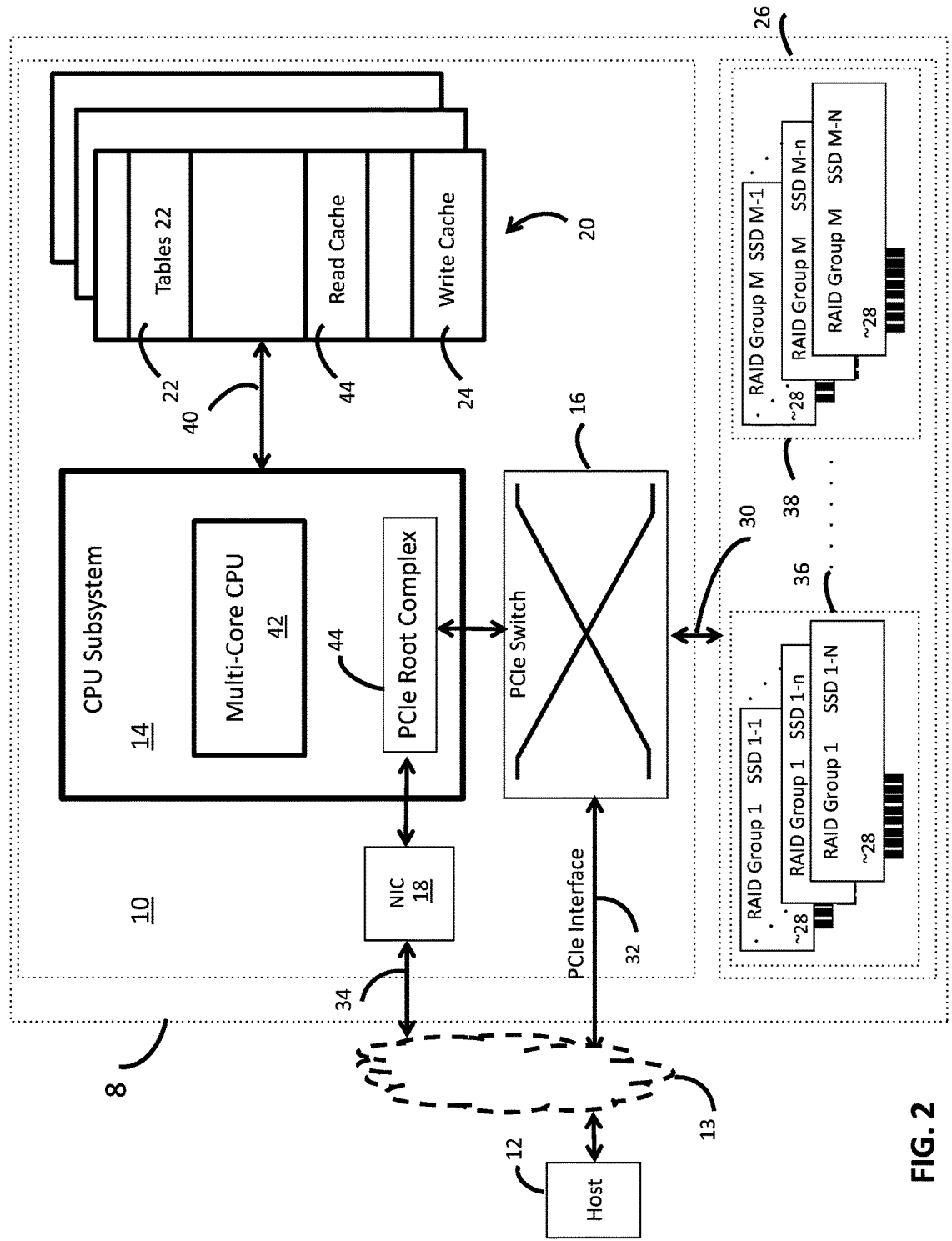
FIG. 2 shows, in block diagram form, further details of the CPU subsystem 14, in accordance with an embodiment of the invention.

FIG. 2 shows, in block diagram form, further details of the CPU subsystem 14, in accordance with an embodiment of the invention. The CPU subsystem 14 is shown to include a CPU 42, which may be a single or multi-core CPU and a PCIe root complex block 44. Among its other functions, the block 44 determines the number of lanes based on the configuration of switch 16 and couples the CPU 42 and the storage pool 26 to the switch 16. The switch 16 may include one or more switches.

FIG. 3a shows the memory 20 having a NVM portion 304 and a DRAM portion 306. Typically, the NVM portion 304 includes the tables 22 and the DRAM portion 306 includes data, in some embodiments.

In FIG. 3b, in accordance with an embodiment of the invention, the NVM 304 is shown in further detail. As shown in FIG. 3b, the NVM 304 includes a valid count table, mapping tables 22, caches 44/24, and a journal 328. The valid count table 320 maintains the number of valid intermediate LBAs (iLBAs) in a block of data. The journal 328 maintains a log of events that are to be used in the event of a recovery.

In FIG. 3c, the tables 22 are shown in greater detail to include a host logical-to intermediate logical (L2iL) addresses 330, intermediate logical-to-SSD logical (iL2sL) addresses 334 and a stripe table 332. Tables 330 and 334 are discussed at length below. Stripe table 332 maintains which and the number of SLBAs present in each segment of a stripe. The table 332 is typically saved in non-volatile memory to prevent loss of its information in the event of an abrupt power disruption. Alternately, the stripe table 332 is unnecessary because the information it maintains may be mathematically derived, which would result in saving memory capacity and the overhead associated with managing the table.

Deduplication and compression are performed in the storage processor 10.

To support deduplication, the storage processor 10 maintains the relationship between host LBAs and iLBAs in the L2iL table 330, shown in FIG. 3c. The L2iL table 330 manages the indirection of the host LBAs to the iLBAs. A new iLBA is assigned to a host LBA when there is no duplication of data associated with the host LBA; data that is being written to the storage appliance 8 is distinct from any data saved in the SSDs of the storage pool 26. Once an iLBA is assigned to the host LBA, the L2iL table is updated accordingly.

The iLBAs are then assigned to SLBAs and maintained in iL2sL tables, such as the iL2sL table 334. There is an associated count (CNT) value accompanying the iLBAs maintained in the iL2sL table 334. These count values are not the same as the valid count valued in the table 320, and are rather for tracking the number of host LBAs mapped to a particular iLBA. Count values of table 330 are indexed by iLBAs and incremented when data that is associated with a host LBA is detected as a duplicate data. That is, the iLBA of the duplicated data already exists in the storage pool 26 and is assigned to the host LBA in addition to having been previously assigned a previous host LBA, which would have accompanied the first time the duplicated host data was received.

The relationship between the iLBA and the host LBA is maintained in the L2iL table 330 where the iLBAs index the table 330. The count value, maintained in the table 334, in association with a SLBA, is decremented when data associated with the count value has changed and is therefore no longer a duplicate of data that is in the corresponding SLBA. The CNT value in iL2sL table 334 is a count of the number of times duplicated data has been referenced by a host LBA. The CNT value is indexed by an associated iLBA in the table 334, in the same manner as corresponding SLBAs are.

When compression is employed in the storage appliance 8, in addition to deduplication, the iL2sL table 334 further includes an offset and a size for every SLBA entry. The compression ratio of the each host input/output ("IO") depends on the entropy of the data, therefore, the size of the compressed data varies from one host IO to another. As such, an offset and a size are required to locate the compressed data in a stripe.

Deduplication and compression in a way cause thin provisioning since these data reduction schemes enable the storage appliance capable of storing data in excess of its physical storage pool; sometimes in excess of 5 to 10 times depending on the workload and data entropy. As such, L2iL table of the storage appliance has to support the exploded virtual capacity requiring substantial amount of non-volatile memory. To minimize the memory footprint for the L2iL table, allocation tables are used which allows memory allocation for these tables per demand.

The following are some of the terms used herein with reference to deduplication;

"Look up": to find out if a copy of the data already exist in the appliance.

"Insertion": when a copy of the data doesn't exist in the appliance.

"Link": a connection between a set of host LBAs identifying the same data.

"Unlink": when a data is no longer the same as what it was when linked and as such the connection is broken.

Figure 4:
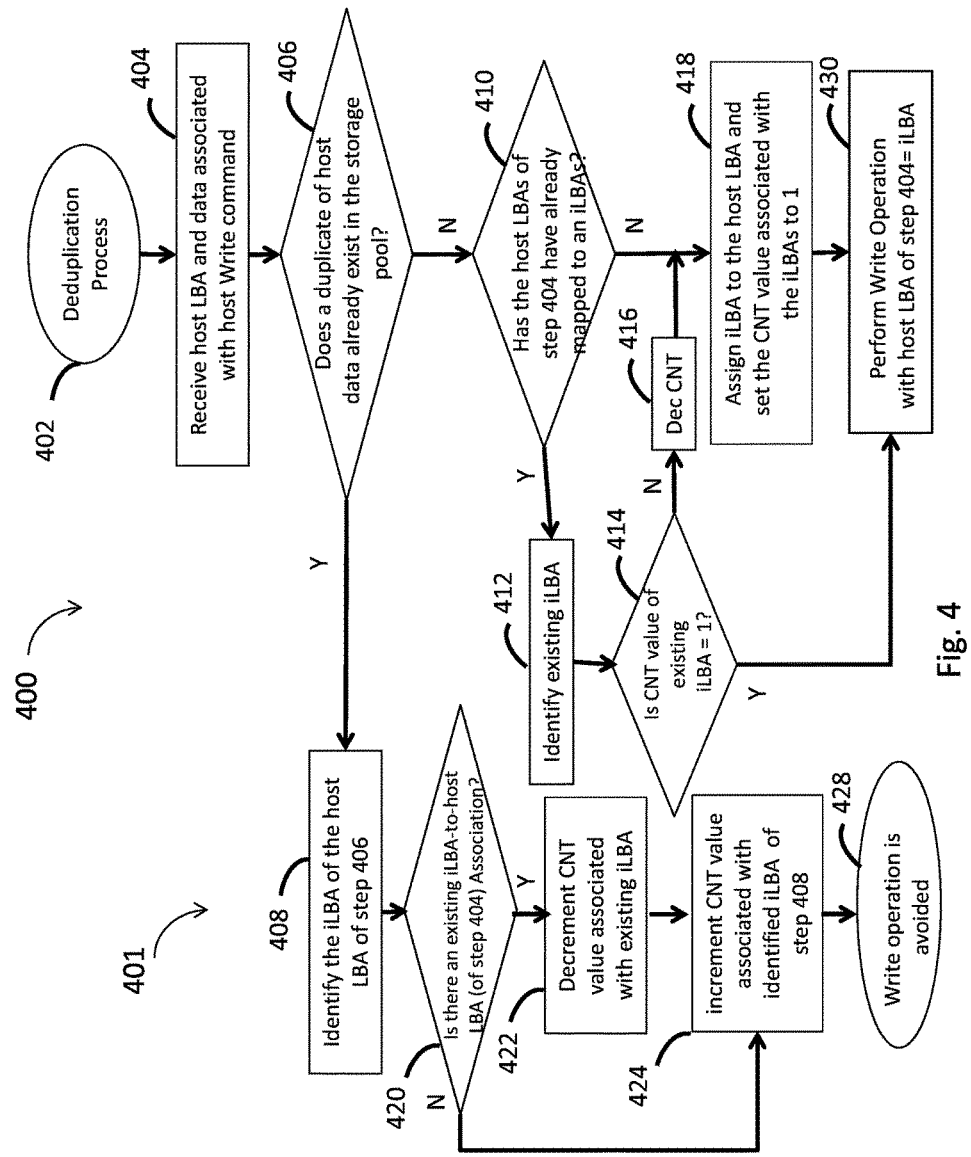
FIG. 4 shows a flow chart of steps performed during a deduplication process performed by the CPU subsystem of the embodiment of FIGS. 1 and 2 on the SSDs, in accordance with methods of the invention.

FIG. 4 shows a flow chart of some of the steps performed during a deduplication process 400, in accordance with embodiments and methods of the invention.

The flow chart of FIG. 4 shows the deduplication process starting at 402 after which step 404 is performed. Up to step 408, no deduplication is actually performed, rather, the process of detecting whether or not a write operation needs to take place begins.

Starting with the step 408, 401 shows a branch of the flow chart where duplication of data is detected, whereas, the remainder of the flow chart of FIG. 4 outlines some of the steps of writing data when a duplication of data is not detected. Therefore, the step 408 and on result in the write operation of the host data being avoided.

At step 404, a write command is received from a host, such as the host 12 of FIGS. 1-2, by the storage appliance 8. Along with the host data, host LBAs are received, identifying the logical location into which the host is asking to save the host data.

The process proceeds to 406 where a determination is made as to whether or not there is a duplicate of the host data in the storage appliance 8. Among numerous ways of performing this determination and without limitation, is the use of a hash table, readily known to those in the art.

If the determination at 406 yields a positive result, i.e. the host data already exists in the storage pool 26, the process proceeds to step 408, where an iLBA (from step 404) is identified in association with the received host LBA and recorded. In some embodiments of the invention among others not listed herein, this recording is done by updating the L2iL table 330 and the iL2sL table 334. If the determination at 406 yields a negative result, i.e. the host data is not found in the storage pool 26, the process proceeds to step 410. In the case where the process proceeds to step 408, the host data of step 404 matches the data in the storage pool 26.

The saved host data in the storage pool 26 that is the same as the one at step 404 has an associated, iLBA, previously assigned to it, which is discussed in further detail with reference to subsequent figures and related discussion herein. At step 408, the iLBA that is associated with the host data is identified and the process proceeds to 420.

At 420, a determination is made as to whether or not there is an existing iLBA that is associated with host data of step 404 in table 330. If not, an actual writing of the host data is avoided because the write command of step 404 is detected to be writing to a previously-stored host data in the storage pool 26. After 420, the step 424 is performed where a CNT value associated with the identified iLBA of step 408 is incremented, accordingly, while not shown in FIG. 4, the L2iL table 330 is updated. The iL2sL table 334 however, remains unchanged. The CNT value represents the number of times an iLBA is associated with various host LBAs. And, the write operation is avoided at 428.

If the determination at 420 yields a positive result in that the identified iLBA, at step 408, is determined to be the same as an existing iLBA, the process proceeds to the step 422. The positive result of 420 indicates that an existing iLBA-to-host LBA association is old therefore requiring updating. The iLBA identified in step 408 is used to index the count value corresponding with the associated host LBA. At step 422, the CNT value in the iL2sL table 334, associated with the existing iLBA, is decremented to indicate that the number of host LBAs referencing the duplicated data is now one less than it was before the subject write operation.

After the step 422, at step 424, the CNT value associated with the identified iLBA (of step 408) is incremented by one to indicate an additional host LBA is being associated with the iLBA and the process comes to an end at 428 with no write operation taking place. The L2iL table 330, indexed by the host LBA of step 404, is updated with the identified iLBA of step 408.

If, at 406, the determination yields a negative result, meaning no duplication of the host data that is to be written is detected, the process proceeds to 410. At 410, a determination is made as to whether or not the host LBAs of the write command have already been mapped to an iLBA. This determination is essentially whether or not the host LBA of step 404 is being written for the first time since either the time of manufacturing of the storage appliance or from the time of the last TRIM command or its equivalent, as noted above. The TRIM command has come to be known in the industry as essentially a command that results in the invalidation of the host LBA. When a host LBA is not mapped to an iLBA in the L2iL table 330 or if the association exists but the CNT value associated with the iLBA is zero, it indicates that the host LBA is being accessed for the first time.

Thus, if at 410 it is determined that the host LBAs of step 404 are not associated with an iLBA, the process moves to step 418. It is noted that at times, "host LBAs" are referenced and at other times "host LBA" is referenced. With regard to host block addresses, these two terms are used interchangeably because the first host LBA and the sector count typically result in multiple host LBAs but "host LBA" is used at times for each of reading.

Further, it should be noted that there are a multitude of ways the storage processor 10 can determine whether a host LBA is being written for the first time are anticipated. One such way is by the absence of an iLBA in a corresponding entry in the L2iL table 330. Another way is by a predetermined value, such as a "NULL" value, or flag used to denote the first time. For example, all "1" s or all "0" s may be employed. These are a couple of many other ways contemplated by the various embodiments and methods of the invention.

At step 418, once the storage processor 10 assigns an available iLBA to the host LBA of step 404, the CNT value associated with the assigned iLBA is set to numeric value '1' in iL2sL table 334. The L2iL table 330 is updated to reflect the association between the host LBA and the iLBA. It is noted that any values used herein, such as "1" for the CNT value, are merely examples and not in any manner restrictive of any of the embodiments of the invention. By way of example, instead of a numeric value '1', another value may be employed without departing from the scope and spirit of the invention.

After step 418, step 430 is performed during which a write operation is performed using the iLBA of step 418 to save the host data of step 404 in the storage pool 26, at a location identified by a SLBA and recorded in the table 334.

If at 410, the result is positive, step 412 is performed where the existing iLBA is identified and associated with the host LBA of step 404. The storage processor 10 identifies the existing iLBA by accessing it from the L2iL table 330 using the host data of step 404 as an index to the table 330.

After step 412, at 414, a determination is made as to whether or not the CNT value associated with the existing iLBA of step 412 is '1' or greater. The CNT value of '1' or greater is indicative of the iLBA being linked, or associated with one or more host LBAs.

If the determination at step 414 is positive with the CNT value detected as numerical value '1', the host LBA of step 404 remains linked to its existing iLBA, in the table 330 and the CNT value remains at '1' and the process proceeds to step 430 where a write operation proceeds using the iLBA of step 412.

However, if the determination at step 414 yields a negative result with the CNT value being larger than '1', the CNT value associated with the existing iLBA is decremented by one, at step 416, thereby breaking the link between the existing iLBA and the host LBA of step 404 and the process proceeds to step 418.

By the time the process reaches step 418, a new link (or assignment) between the host LBA of step 404 and an iLBA has been established, as discussed previously.

At step 418, the host LBA of step 404 is assigned to an available iLBA and the CNT value associated with the assigned iLBA is set to '1' and the process proceeds to step 430. At step 430, the write operation takes place using the iLBA of step 418.

In summary, the L2iL table is used in various embodiments of the invention to provide indirection of the host LBAs to an iLBA, in order to resolve problems associated with deduplication. Because of deduplication, the number of host LBAs may point to the same data in the storage pool 26. To this end, the link between host LBAs associated with the host data is tracked and unlinked once the host data is no longer the same. Host LBAs having the same host data are associated with the same iLBA and this association is maintained in the L2iL table. The iL2sL table maintains the association of iLBAs to SLBAs. The iLBAs serve as indexes to the iL2sL table. The iL2sL table also maintains a CNT field for saving a CNT (value) indicative of the number of host LBAs linked to a particular iLBA with the same host data. A CNT of '1', or any other predetermined value, indicates that a host LBA has been written to and there is no duplicate of the associated host data. The CNT is incremented every time a duplicate of the host data in association with another host LBA is written.

When a host LBA with a duplicate data is written, only the L2iLs of the L2iL table and the iL2sL of the iL2sL table are updated and the duplicated host data is actually not written to the storage pool 26 since a copy of it already exists. The storage processor 10 determines whether or not a duplicate of the host data already exists in the storage pool 26 and it determines a duplicate exists, the storage processor 10 identifies the iLBA that is associated with the duplicate host data in the storage pool 26. The identified iLBA is assigned to the host LBA that accompanied the host command, the L2iL table is updated accordingly, and the CNT associated with the identified iLBA is incremented.

When host data that is associated with one of the host LBAs and linked to the same iLBA changes, the link between the host LBA and the previously-assigned iLBA is broken (unlinks). To unlink, the storage processor 10 assigns another (or new) iLBA to the host LBA, the L2iL table is updated accordingly, and the CNT associated with the previously-assigned iLBA is decremented but the CNT associated with the new iLBA is incremented to accommodate the newly-linked host LBA.

In summary, two situations result in avoidance of a write operation with both situations occurring when the process reaches step 408. One situation is where an association of an iLBA to the host LBA of step 404 already exists in the storage pool 26 and another is where there is no existing association in the table 330 between the iLBA of step 408 and the host LBA of step 404, for example, the iLBA entry in table 330 has a "NULL" value. In the latter situation, the CNT value is incremented. Other than the foregoing two occurrences, a write operation takes place. Accordingly, many write operations are prevented and system resources are more efficiently utilized as a result. Additionally, system performance is improved and costs are reduced.

Figure 5:
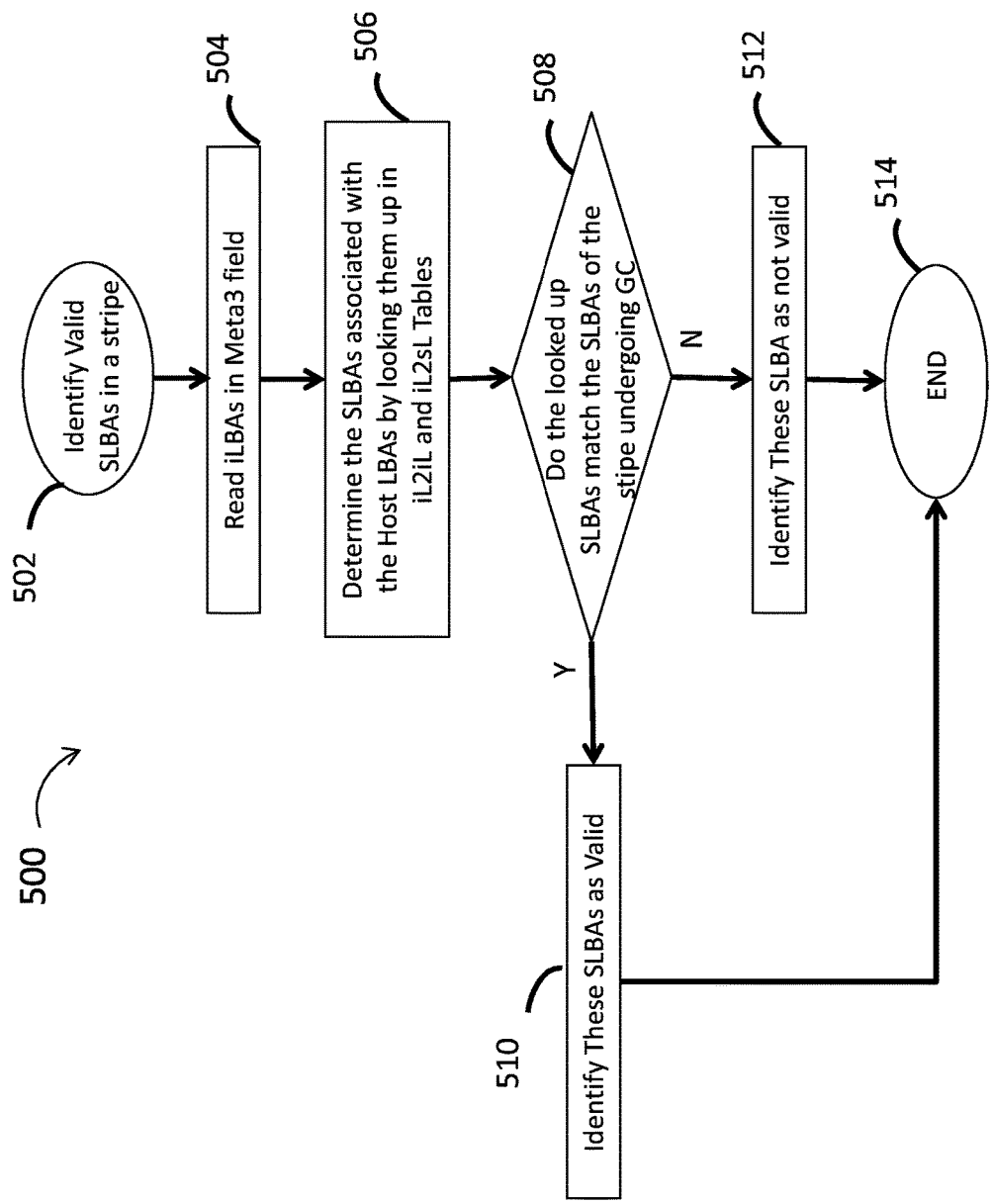
FIG. 5 shows a flow chart of steps performed during identification of valid SLBAs in a stripe, in accordance with method of the invention.

FIG. 5 shows a flow chart 500 of some of the steps performed by the CPU subsystem 14 when identifying valid SLBAs in a stripe, in accordance with methods and embodiments of the invention. Most often, a garbage collection process may be on-going to clean-out invalid SLBAs of stripes. CPU subsystem 14 identifies a stripe or a group of stripes to undergo logical garbage collection. Stripes (or group of stripes) with the largest number of invalid SLBAs are typically chosen to undergo (logical) garbage collection by the CPU subsystem 14. Invalid SLBAs point to invalid data in the SSDs.

Status of the SLBAs, identifying data in SSDs as valid (current) or invalid (old) may be maintained in the non-volatile memory 304, in accordance with an embodiment of the invention. It is understood that other embodiments may maintain this status information elsewhere in the storage processor 10.

The garbage collection process frees up (or makes available) the largest number of SLBAs. SSDs (storage pool 26) perform physical garbage collection.

In one embodiment, the stripe, or group of stripes, as the case may be, along with the most number of invalid SLBAs is chosen as a candidate for garbage collection.

Referring still to FIG. 5, a flow chart 500 of some of the steps for performing logical garbage collection of a stripe is shown. At 502, valid SLBAs of a stripe are identified. When garbage collection is performed at a gradient, such as a group of stripes, the steps of flow chart 500 are performed on a per-stripe level. At step 504, the CPU subsystem 14 reads iLBAs from the meta3 field, the read iLBAs corresponding to respective SLBAs of the stripe undergoing garbage collection. Further discussions of the 'meta3' field is presented later in association with subsequent figures.

Next, at step 506, SLBAs that are associated with the received host LBAs are identified using iL2sL table 334. The CPU subsystem 14 uses the iLBAs from step 504 to index the iL2sL table 334 and to identify associated SLBAs.

Next, at 508, a determination is made as to which, if any, of the SLBAs from the iL2sL table 334, identified at step 506, match the SLBAs of the stripe that is undergoing garbage collection. Thus, at step 510, valid SLBAs are identified and the process ends at 514. The remainder of the SLBAs, at 508, are found invalid at step 512 and. the process terminates at step 514.

At 508, any SLBAs of the table 334 that do not match the SLBAs of the stripe undergoing garbage collection are identified as invalid SLBAs, at step 512. After step 512, the process ends at 514.

When logical garbage collection is done at a level or gradient defined by a group of stripes, the steps of process 500 are repeated for each of the stripes of the group of stripe.

FIG. 6a shows an exemplary L2iL table 604, in association with various deduplication embodiments and methods of the invention. The storage processor maintains host logical block address (LBA) to an intermediary logical block address (iLBA) in L2iL table. iLBA is an indirection used for mapping host LBAs to SSD LBAs (SLBAs). Multiple Host LBAs having the same data are assigned a same iLBA and iLBAs are eventually mapped to SLBAs. In the example of L2iL 604, Host LBAs 4 630, Host LBA 7 632, and Host LBA 13 634 having the same data are assigned to iLBA 2.

FIG. 6b shows an exemplary iL2sL table 606 with each entry indexed by an iLBA and having a SLBA field 608 and CNT field 610. The relationship between the iLBAs and SLBAs are maintained in iL2sL table 606.

In the examples of FIGS. 6a and 6b, Host LBAs are assigned to iLBAs and the assignment is maintained in L2iL table 604 and iLBAs are assigned to SLBAs and the assignment is maintained in iL2sL table 606. In this example, host LBA 4 is written to and data associated with the host LBA 4 is not a duplicate, therefore LBA 4 is being assigned iLBA 2. iLBA 2 is subsequently assigned to SLBA E with CNT equal to 1. Host LBA 7 is written to later with data being duplicate of LBA 4, therefore LBA 7 is also assigned to iLBA 2, CNT value associated with iLBA 2 is incremented to 2, and write process terminates. Host LBA 13 is written to at some time in the future with data being duplicate of LBA 4 and LBA 11 is again assigned to iLBA 2 and CNT value associated with iLBA 2 620 is incremented to 3. As illustrated, iLBA 2 is referenced three times by different host LBA and is assigned to SLBA only once. In the event that data associated with one of the host LBAs; i.e. LBA 7, linked to iLBA 2 is updated with a different data, LBA 7 link to iLBA 2 is broken by being assigned to another iLBA and CNT value associated with iLBA 2 is decremented.

FIG. 7a shows an exemplary structure of a data segment in association with compression, in accordance with an embodiment of the invention. A data segment generally includes multiple compressed host data, accompanied by other fields. An address offset along with the size of a compressed host data and its accompanying fields identify the boundary of the location of a compressed host data. For example, the offsets shown in FIG. 7a each, along with the size of the compressed host data and its accompanying fields, identify the next offset (or boundary), which is the location where the next compressed host data begins. The compressed host data and its accompanying fields are referred to herein as "compressed data field". In FIG. 7a, more specifically, a data segment 700 is shown to include the following fields: compressed host data 702, meta1 704, and meta2 706, the combination of which is compressed data field 708. Meta1 704 may include metadata from the host 12. Meta2 may include data such as cyclic redundancy code (CRC) used for checking the integrity of the data in the storage pool. In some embodiments, meta data, such as meta1 and/or meta2, are not compressed yet in other embodiments they are compressed. In current typical applications, meta data is not compressed.

The size of the compressed host data 702 may be variable; accordingly, the size of the compressed host data is recorded in an iL2sL table, for use during decompression. For instance, compression of a fixed-sized host data may yield a compressed version of host data with a variable size after compression. This is because compression is based on the entropy of the data. Therefore, the size of the compressed host data is recorded in an iL2sL table and used during decompression.

Also, since compression yields different data sizes, the data location within the data segment and within a stripe is not at a fixed location within the data segment or within the stripe. Therefore, the offset of the compressed host data within a data segment or a stripe is also recorded in an iL2sL table.

FIG. 7b shows an iL2sL table entry 720, in association with compression and deduplication, in accordance with an exemplary embodiment of the invention. The entry 720 is shown to include the following fields: SSD/SLBA 722, CNT value 724, offset 726, and size 728. The SSD/SLBA 722 includes a SSD number and a SLBA. As noted earlier, the size of the compressed host data 702 is recorded. In the embodiment of FIG. 7b, the size is recorded in the size field 728. The entry 720 is shown among other entries in the iL2sL table 760 of FIG. 7c.

FIG. 7c shows an exemplary iL2sL table 760 in embodiments using compressed host data, in accordance with various methods and embodiments of the invention. As noted above, compressed host data has a variable size. Thus, the size of each of the iLBAs in FIG. 7c is recorded in the size field 728. Similarly, the offset field 726 includes offset for each of the iLBAs and the count value field 724 includes the count value for each of the iLBAs. For example, for the iLBA 6, in FIG. 7c, the count value 782 is recorded as '2', the offset 790 is recorded as '32' and the size 792 is recorded as 2044. The SSD/SLBA 722 each include SSD numbers and SLBAs, as earlier described relative to FIG. 6b.

In an exemplary embodiment, the tables 606 and 760 are maintained in the iL2sL table 334 of FIG. 3c. Obviously, the variable size of the compressed host data, for example the compressed host data 702, affects the size of the compressed data field, i.e. compressed data field 708.

FIGS. 8a and 8b show exemplary structures of a data segment in association with compression, in accordance with another embodiment of the invention. More specifically, as shown in FIG. 8a, segment 800 includes the fields of the segment 700 of FIG. 7a with the addition of a meta3 field 802. It is noted that meta3 field 802 maintains a value representing meta3 that is typically only a part of one, and not all, of the segments of a stripe. As described in further detail in FIG. 8b, meta3 is the host LBAs or host LBA's associated iLBAs of the compressed host data of a stripe as well as the number of iLBAs (or host LBAs) of the same stripe.

FIG. 8b shows another exemplary meta3 field 802. Namely, the meta3 of field 802 is shown to include the number of iLBAs 820 followed by the iLBAs 822 through 830 of a stripe. As earlier indicated, in place of the number of iLBAs, the meta3 802 may maintain the number of host LBAs associated with the iLBAs of the stripe in which case, the host LBAs rather than the iLBAs 830 follow.

In an embodiment of the invention, the meta3 is kept in the last data segment of the stripe. Alternatively, the meta3 may be kept in the first data segment of the stripe. Meta3 802 in conjunction with the iL2sL table 760 is used during garbage collection to identify valid and invalid iLBAs, as described below.

When the stripe is subject to logical garbage collection, the iLBAs of the meta3 field of the stripe are read by the storage processor 10 and compared against the SLBA entries in the iL2sL table 760. Meta3 offers an integrity check of the SLBAs of the stripe to which the SLBAs belong. That is, upon reading of the meta3 of the segments of a stripe, such as the meta3 802, the iLBAs of the meta3 are used to index the table 760 to retrieve corresponding SLBAs. The SLBAs from the table 760 are then compared to the SLBAs read from segments of the stripe of the storage pool 26. Upon a mismatch, the integrity of the iLBA is in question therefore, the SLBA(s) associated with the iLBA is presumed invalid (or "old") and becomes a candidate for garbage collection. But upon a match, the SLBA(s) is presumed to have integrity. Stated differently, upon identifying old SLBAs and upon the old SLBAs matching the SLBAs of a stripe, logical garbage collection is performed by the storage processor.

FIG. 9 shows exemplary system 900, in accordance with an embodiment of the invention.

By way of background, along with host data and host LBAs, the host 12 of FIG. 1 sends logical unit numbers (LUNs) to the storage appliance 8. Thus, the iLBA discussed hereinabove relative to various embodiments of the invention, are generated for each LUN. A host LBA that is identical to a previous host LBA may have a LUN that is different than the previous host LBA. Thus, in an embodiment of the invention, based on the LUN number, a distinct L2iL table is utilized.

Referring back to FIG. 9, the system 900 is shown to include a virtual storage 920, virtual storage mapping tables, i.e. LUN L2iL tables, 904-910, physical storage mapping table, i.e. LUN iL2sL table 912, and a physical storage pool 930, in accordance with an embodiment of the invention. The virtual storage 920 is shown to include LUNs 922 and the physical storage pool 930 is shown to include SSDs 932. The storage pool 930 is analogous to the storage pool 26 of FIGS. 1 and 2, the L2iL tables 904-910 are each analogous to the L2iL table 604, and the iL2sL table 912 is analogous to the iL2sL table 606 of FIGS. 6a and 6b.

The storage appliance 8 receives a command from the host 12 to generate a LUN prior to receiving any commands from the host. All read or write commands, including those for LUNs not yet created, are aborted by the storage processor. This results in the generation of a LUN command that is accompanied by the size of the LUN. Each LUN 922 has a range of host LBAs based on the size of the LUN. The CPU subsystem 14 then allocates resources to the LUN, it associated the LUN to a LUN number and a corresponding L2iL table that is initially a blank table with "NULL" values. Size of the L2iL table corresponds to the size of the LUN. In summary, then, the host LBAs of LUNs are mapped to iLBAs and these mappings are maintained in their individual L2iL tables 904-910. The LUN L2iL tables 904-910 collectively manage the virtual capacity (or thin provisional capacity) of the virtual storage 920 to the iLBAs. The iLBAs are in turn mapped to the SSDs 932 of the storage pool 930 and this mapping is maintained in the iL2sL table 912.

More specifically, upon generating the LUN, i.e. LUN 922, the storage appliance 8 receives a host read command that includes a LUN number along with the host LBAs. The LUN number is used to identify the corresponding L2iL table, among the L2iL tables 904-910 and the host LBA, which is accompanied by the host LBA from the host 12, is used to index the L2iL table to retrieve an iLBA. The iL2sL table is shared among the LUNs 922 and used to address the storage pool 26 to retrieve the SLBA that identifies the location within the storage pool 26 with the host data. The host data is then read by the storage processor 10.

Although the invention has been described in terms of specific embodiments, it is anticipated that alterations and modifications thereof will no doubt become apparent to those skilled in the art. It is therefore intended that the following claims be interpreted as covering all such alterations and modification as fall within the true spirit and scope of the invention.

The invention claimed is:

1. A method of de-duplication comprising:
receiving host data from a host, the host data being accompanied by a received host logical block number (LBA) and to be stored in solid state disks (SSDs);
determining whether or not the received host data is the same as an existing host data, the existing host data being identifiable by an existing host LBA;
upon determining that the received host data is the same as the existing host data, indexing a first table using the existing host LBA to retrieve an intermediate LBA (iLBA);
linking the iLBA with the received host LBA in the first table, to avoid a write operation to the SSDs;
upon determining that the received host data is not the same as the existing host data, identifying an available iLBA;
linking the received host LBA to the identified iLBA; and
writing the received host data to a location within the SSDs identified by use of the iLBA.

2. The method of de-duplication, as recited in claim 1, wherein during the writing, identifying an available SSD LBA (SLBA) and saving the SLBA to a second table indexed by the identified iLBA so as to create an association between the identified iLBA and the available SLBA.

3. The method of deduplication, as recited in claim 1, further including maintaining a count of the number of duplications of the host data.

4. The method of deduplication, as recited in claim 3, wherein the count is incremented upon the determining that the received host data is the same as the existing host data.

5. The method of deduplication, as recited in claim 3, wherein the count is decremented upon the step of determining that the received host data is not the same as the existing host data.

6. The method of deduplication, as recited in claim 1, further including using an offset to address the SSDs when compressing the host data.

7. The method of deduplication, as recited in claim 1, further including using meta data identifying host LBAs.

8. The method of deduplication, as recited in claim 7, wherein during the writing, identifying an available SSD LBA (SLBA) and saving the SLBA to a second table indexed by the identified iLBA.

9. The method of deduplication, as recited in claim 8, further including identifying valid SLBAs using the first and second tables.

10. The method of deduplication, as recited in claim 1, further including identifying old SSD LBAs (SLBAs) and upon the old SLBAs matching the SLBAs of a stripe, performing logical garbage collection.

11. The method of deduplication, as recited in claim 1, further including receiving a logical unit number (LUN) from the host and allocating a distinct first table to the LUN.

12. A method of de-duplication employing solid state disks (SSDs) comprising:
receiving host data from a host, the host data being accompanied by a current host logical block number (LBA);
upon the host data not being a duplicate host data, identifying an available intermediate LBA (iLBA);
linking the current host LBA to the identified iLBA and during writing of the current host data, identifying an available SLBA and saving the SLBA to a second table indexed by the identified iLBA;
writing the host data to the SSDs at a location identified by the SLBA; and
upon subsequently receiving a duplicate of the host data accompanied by a different host LBA, linking the different host LBA to the identified iLBA and avoiding an actual write of the duplicate host data to the SSDs.

13. The method of de-duplication, as recited in claim 12, wherein during the subsequently receiving step, finding a match in the SSDs between the current host data and the duplicate host data after receiving the duplicate host data and saving the identified iLBA to a location in a first table, indexed by the different host LBA so that the current host LBA and the different host LBA point to the identified iLBA in the first table.

14. The method of deduplication, as recited in claim 12, further including maintaining a count of the number of duplications of the host data.

15. The method of deduplication, as recited in 12, further including using an offset to address the SSDs when compressing the current host data and the different host data.

16. The method of deduplication, as recited in claim 12, further including using meta data, identifying the host LBA.

17. The method of deduplication, as recited in claim 12, further including upon old SLBAs matching the SLBAs of a stripe, performing logical garbage collection.

18. The method of deduplication, as recited in claim 12, further including receiving a logical unit number (LUN) from the host, and allocating a distinct first table to the LUN, the distinct first table being one of the first tables.

19. A method of de-duplication comprising:
receiving host data from a host, the received host data being accompanied by a received host logical block number (LBA) and to be stored in solid state disks (SSDs);
determining whether or not the received host data is the same as an existing host data, the existing host data having linked therewith an intermediate (iLBA) and being identifiable by an existing host LBA;
upon determining that the received host data is the same as the existing host data, linking the received host LBA with the iLBA to avoid a write operation to the SSDs;
upon determining that the received host data is not the same as the existing host data, identifying an available iLBA;
linking the received host LBA to the identified iLBA; and
writing the received host data to a location within the SSDs identifiable by the iLBA.

20. The method of deduplication of claim 19, wherein further receiving a logical unit number (LUN) from the host and generating a distinct first table associated with the LUN.

* * * * *